US008467166B2

(12) United States Patent
Montich

(10) Patent No.: US 8,467,166 B2
(45) **Date of Patent: *Jun. 18, 2013**

(54) CIRCUIT BREAKER WITH HIGH-SPEED MECHANICALLY INTERLOCKED IMPEDANCE GROUNDING SWITCH

(75) Inventor: Eduardo Montich, Buenos Aires (AR)

(73) Assignee: EMA Electromechanics, LLC, Sweetwater, TX (US)

( * ) Notice: Subject to any disclaimer, the term of this patent is extended or adjusted under 35 U.S.C. 154(b) by 360 days.

This patent is subject to a terminal disclaimer.

(21) Appl. No.: 12/917,013

(22) Filed: Nov. 1, 2010

(65) Prior Publication Data

US 2011/0056917 A1 Mar. 10, 2011

Related U.S. Application Data

(63) Continuation-in-part of application No. 12/535,483, filed on Aug. 4, 2009, now Pat. No. 8,174,812, which is a continuation-in-part of application No. 11/840,948, filed on Aug. 18, 2007, now Pat. No. 7,724,489.

(51) Int. Cl.
*H02H 7/00* (2006.01)

(52) U.S. Cl.
USPC .......... 361/115

(58) Field of Classification Search
USPC .......... 361/115
See application file for complete search history.

(56) References Cited

U.S. PATENT DOCUMENTS

| | | | | |
|---|---|---|---|---|
| 3,883,706 | A * | 5/1975 | Glaser | 200/11 A |
| 5,612,523 | A | 3/1997 | Hakamata et al. | |
| 6,048,216 | A | 4/2000 | Komuro | |
| 6,759,617 | B2 | 7/2004 | Yoon | |
| 7,223,932 | B2 | 5/2007 | Kobayashi et al. | |

* cited by examiner

*Primary Examiner* — Stephen W Jackson
(74) *Attorney, Agent, or Firm* — Egbert Law Offices, PLLC

(57) ABSTRACT

A circuit breaker and impedance grounding switch having a first electrical terminal, a second electrical terminal, a third electrical terminal, a first vacuum bottle with a pair of contactors therein, a second vacuum bottle with a pair of contactors therein, and a mechanically interlocked linkage being electrically interconnected to the second electrical terminal and being movable between a first stable position and a second stable position. One of the pair of contactors of the first vacuum bottle is connected to the first electrical terminal. One the pair of contractors of the second vacuum bottle is electrically interconnected to the third electrical terminal. The linkage has a temporary position between the first and second stable positions electrically connecting simultaneously the first electrical terminal to the second electrical terminal and a third electrical terminal to the second electrical terminal.

17 Claims, 3 Drawing Sheets

CIRCUIT BREAKER WITH HIGH-SPEED MECHANICALLY INTERLOCKED IMPEDANCE GROUNDING SWITCH

CROSS-REFERENCE TO RELATED APPLICATIONS

The present application is a continuation-in-part of U.S. patent application Ser. No. 12/535,483, filed on Aug. 4, 2009 now U.S. Pat. No. 8,174,812, and entitled "Mechanically-Interlocked Transfer Switch". U.S. patent application Ser. No. 12/535,483, is a continuation-in-part of U.S. patent application Ser. No. 11/840,948, filed on Aug. 18, 2007, and entitled "Circuit Breaker with High Speed Mechanically-Interlocked Grounding Switch". U.S. patent application Ser. No. 11/840,948 issued as U.S. Pat. No. 7,724,489, on May 25, 2010.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to vacuum circuit breakers. More particularly, the present invention relates to circuit breakers having a high speed mechanically interlocked impedance grounding switch. The present invention also relates to circuit breakers and impedance grounding switches for use in collection feeders of wind and solar farms as well as distribution feeders of distributed generation systems.

2. Description of Related Art Including Information Disclosed Under 37 CFR 1.97 and 37 CFR 1.98

Medium voltage collection feeders in wind and solar applications are usually subject to ground fault overvoltage when feeder circuit breakers open during a feeder ground fault. This also occurs in 4-wire multigrounded neutral feeders having ungrounded or ineffectively grounded distributed generation sources feeding in.

An impedance grounding switch is a device intended to close and connect a load bank impedance in parallel connection with the feeder. This closing and connecting can occur an instant before the feeder circuit breaker opens as consequence of a feeder ground fault. As such, the impedance grounding switch provides the ability to suppress such ground fault overvoltages.

The interruption of electrical power circuits has always been an effect of either a circuit breaker or switch. This interruption can occur as a protective measure or a power management decision. In early switching techniques, circuits could be broken only by separation of contacts in air followed by drawing the resulting electric arc out to such a length that it could no longer be maintained. The basic problem is to control and quench the high power arc. This necessarily occurs at the separating contacts of a switch or breaker when opening high current circuits. Since arcs generate a great deal of heat energy which is often destructive to the contacts, it is necessary to limit the duration of the arc and to develop contacts that can withstand the effect of the arc during multiple occurrences.

A vacuum switch or circuit breaker uses the rapid dielectric recovery and high-dielectric strength of the vacuum. A pair of contacts are hermetically sealed in a vacuum envelope. An actuating motion is transmitted through bellows to the movable contact. When the electrodes are parted, an arc is produced and supported by metallic vapor boiled from the electrodes. Vapor particles expand into the vacuum and condense on solid surfaces. At a natural current zero, the vapor particles disappear and the arc is extinguished.

In the past, various patents have issued relating to such vacuum switches and circuit breakers. For example, U.S. Pat. No. 5,612,523, issued on Mar. 18, 1997 to Hakamata et al., teaches a vacuum circuit-breaker and electrode assembly. A portion of a highly conductive metal member is infiltrated in voids of a porous high melting point metal member. Both of the metal members are integrally joined to each other. An arc electrode portion is formed of a high melting point area in which the highly conductive metal is infiltrated in voids of the high melting point metal member. A coil electrode portion is formed by hollowing out the interior of a highly conductive metal area composed only of the highly conductive metal and by forming slits thereon. A rod is brazed on the rear surface of the coil electrode portion.

U.S. Pat. No. 6,048,216, issued on Apr. 11, 2000 to Komuro, describes a vacuum circuit breaker having a fixed electrode and a movable electrode. An arc electrode support member serves to support the arc electrode. A coil electrode is contiguous to the arc electrode support member. This vacuum circuit breaker is a highly reliable electrode of high strength which undergoes little change with the lapse of time.

U.S. Pat. No. 6,759,617, issued on Jul. 6, 2004 to S. J. Yoon, describes a vacuum circuit breaker having a plurality of switching mechanisms with movable contacts and stationary contacts for connecting/breaking an electrical circuit between an electric source and an electric load. The actuator unit includes at least one rotary shaft for providing the movable contacts with dynamic power so as to move to positions contacting the stationary contacts or positions separating from the stationary contacts. A supporting frame fixes and supports the switching mechanism units and the actuator unit. A transfer link unit is used to transfer the rotating movement of the rotary shaft to a plurality of vertical movements.

U.S. Pat. No. 7,223,923, issued on May 28, 2007 to Kobayashi et al., provides a vacuum switchgear. This vacuum switchgear includes an electro-conductive outer vacuum container and a plurality of inner containers disposed in the outer vacuum container. The inner containers and the outer container are electrically isolated from each other. One of the inner vacuum containers accommodates a ground switch for keeping the circuit open while the switchgear is opened. A movable electrode is connected to an operating mechanism and a fixed electrode connected to a fixed electrode rod. Another inner vacuum container accommodates a function switch capable of having at least one of the functions of a circuit breaker, a disconnector and a load switch.

It is an object of the present invention to provide a vacuum circuit breaker system including an integral high-speed impedance grounding switch at a relatively low cost.

It is a another object of the present invention to provide a vacuum circuit breaker system including an integral high-speed impedance grounding switch that is mechanically interlocked.

It is a further object of the present invention to provide an impedance grounding switch device that is timed to automatically close into a load bank impedance just before the feeder circuit breaker opens.

It is still a further object of the present invention to provide a vacuum circuit breaker with an integral high-speed impedance grounding switch that can be applied and operated in the range of 400 volts to 38 kilovolts.

These and other objects and advantages of the present invention will become apparent from a reading of the attached specification and appended claims.

BRIEF SUMMARY OF THE INVENTION

The present invention is a circuit breaker and impedance grounding switch comprising a first electrical terminal, a second electrical terminal, a third electrical terminal, a first vacuum bottle having a pair of contactors therein, a second vacuum bottle having a pair of contactors therein, and a mechanically interlocked linkage being electrically interconnected to the second electrical terminal and being movable between a first stable position and a second stable position. The first vacuum bottle has one of its pair of contactors electrically interconnected to the first electrical terminal. The second vacuum bottle has one of its pair of contactors electrically interconnected to the third electrical terminal. The first stable position of the mechanically interlocked linkage electrically connects the first electrical terminal to the second electrical terminal. The second stable position of the mechanically interlocked linkage electrically connects the third electrical terminal to the second electrical terminal. The mechanically interlocked linkage has a temporary position between first and second stable positions that electrically connect simultaneously the first electrical terminal to the second electrical terminal and the third electrical terminal to the second electrical terminal.

In the present invention, an actuating means is provided for moving the mechanically interlocked linkage between the first stable position and the second stable position. The first vacuum bottle is in longitudinal alignment with the second vacuum bottle. The mechanically interlocked linkage is interposed between the first vacuum bottle and the second vacuum bottle. The mechanically interlocked linkage comprises an actuator arm having the other of the pair of contactors of the first vacuum bottle electrically connected thereto. The actuator arm has the other of the pair of contactors of the second vacuum bottle electrically connected thereto. The pair of contractors of the first vacuum bottle are electrically connected together in the first stable position. The pair of contractors of the first vacuum bottle remain electrically connected together in the temporary position between the first and second stable positions. The pair of contactors of the first vacuum bottle are electrically isolated from each other in the second stable position. The pair of contractors of the second vacuum bottle are electrically isolated from each other in the first stable position. The pair of contactors of the second vacuum bottle are electrically connected together in the temporary position between the first and second stable positions. The pair of contactors of the second vacuum bottle remain electrically connected together in the second stable position.

The present invention is also an integral circuit breaker and impedance grounding switch apparatus that has a first vacuum bottle having a first contactor and a second contractor therein, a second vacuum bottle having a first contactor and a second contactor therein, an actuator arm connected at one end to the second contactor of the first vacuum bottle and connected at the other end to the first contactor of the second vacuum bottle, and a means for moving the actuator arm between a first stable position in which the second contactor of the first vacuum bottle contacts the first contractor the first vacuum bottle and a second stable position in which the first contactor of the second vacuum bottle contacts the second contractor of the second vacuum bottle. This means serves to move the actuator arm to a temporary position between the first and second positions in which the second contactor of the first vacuum bottle contacts the first contactor of the first vacuum bottle and in which the first contactor of the second vacuum bottle contacts the second contractor of the second vacuum bottle, simultaneously. The first contactor of the first vacuum bottle is connected to a substation bus. The second contactor of the second vacuum bottle is connected to a load bank impedance. The actuator arm is connected to the collection/distribution feeder.

The collection/distribution feeder is connected by a bus to the actuator arm. The substation bus is connected by a bus to the first contractor of the first vacuum bottle. The load bank impedance is connected by a conductor or bus to the second contactor of the second vacuum bottle. Power is passed from the substation bus to the collection/distribution feeder (or vice versa) when the actuator arm is in the first stable position. The substation is a three-phase system. The collection/distribution feeder is a three-phase system. The load bank impedance is also a three-phase system. Similarly, the actuator arm is a three-phase system. The first vacuum bottle has three vacuum bottles. The first contactor in each of the three vacuum bottles is connected to a separate phase of the substation bus. The second vacuum bottle also comprises three vacuum bottles. The second contractor in each of the three vacuum bottles of the second vacuum bottle is connected to a separate phase of the load bank impedance. The three-phase system of the actuator arm is connected to a separate phase of the collection/distribution feeder.

The first contactor of the first vacuum bottle is electrically connected to a first electrical terminal. The actuator arm is electrically interconnected to a second electrical terminal. The second contactor of the second vacuum bottle is connected to a third electrical terminal. The first electrical terminal is connected to the substation bus. The second electrical terminal is connected to the collection/distribution feeder. The third electrical terminal is connected to the load bank impedance. An enclosure can extend over and around the first and second vacuum bottles and the actuator arm. The first, second and third electrical terminals extend outwardly of this enclosure. The substation bus, the collection/distribution feeder and the load bank impedance have a voltage ranging from the 400 volts to 38 kilovolts.

The present invention is also a system for passing energy from a substation bus to a collection/distribution feeder (or vise versa). This system includes a first bus connected to the substation bus, a second bus connected to collection/distribution feeder, and third bus connected to the load bank impedance. An integral circuit breaker and impedance grounding switch is interconnected between a contactor of the first bus and a contactor of the second bus and a contactor of the third bus. This integral circuit breaker and impedance grounding switch has means for mechanically and selectively connecting the contactor of the first bus to the contactor of the second bus or for connecting the contactor of the third bus to the contactor of the second bus. A first vacuum bottle has the contactor for the first bus and the contactor for the second bus therein. A second vacuum bottle has the contactor for the second bus and the contactor for the third bus therein. A mechanically interlocked linkage with an actuator arm extends between the first and second vacuum bottles. The actuator arm is electrically interconnected to the second bus.

DETAILED DESCRIPTION OF THE INVENTION

Figure 1:
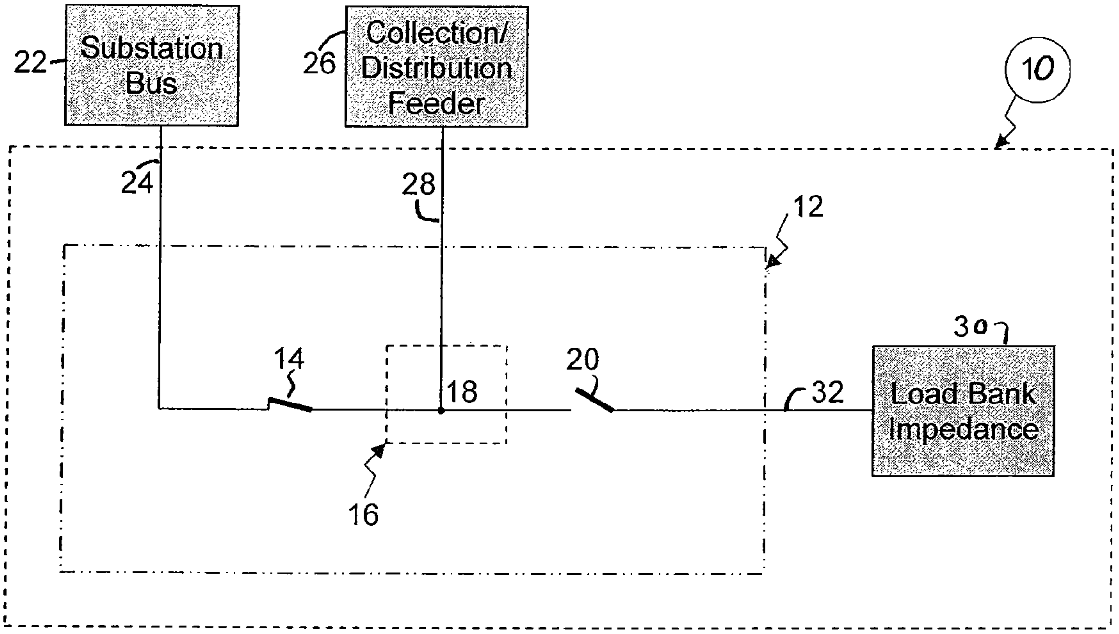
FIG. 1 is a block diagram showing the integral circuit breaker and impedance grounding switch system of the present invention.

Referring to FIG. 1, there is shown the system 10 of the present invention. The integral circuit breaker and impedance grounding switch of the system 10 of the present invention includes a integral circuit breaker and impedance grounding switch 12. The integral circuit breaker and impedance grounding switch 12 is formed of a circuit breaker 14, a mechanically interlocked linkage 16 having an actuator arm 18, and an impedance grounding switch 20. A substation bus 22 is connected by bus 24 to the integral circuit breaker and impedance grounding switch. A collection/distribution feeder 26 is connected by the bus 28 to the integral circuit breaker and impedance grounding switch 12. A load bank impedance 30 is connected by the bus 32 to the integral circuit breaker and impedance grounding switch 12. When the actuator arm 18 is suitably placed in the first stable position, the circuit breaker 14 is suitably closed so as to be used for transferring energy from the substation bus 22 along bus 24 to the collection/distribution feeder 26 along bus 28 (or vice versa). In this first stable position, the impedance grounding switch 20 is open. As such, the load bank impedance 30 is isolated from the system.

Figure 2:
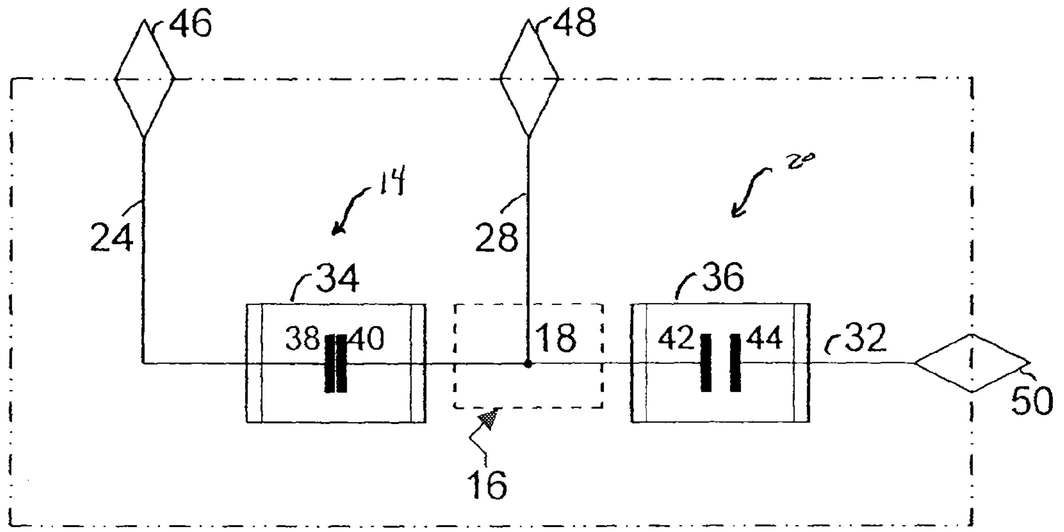
FIG. 2 is an illustration of the mechanical interlock of the present invention in combination with the first and second vacuum bottles and showing, in particular, the actuator arm in the first stable position.

FIG. 2 illustrates the operation of the actuator arm 18 of the mechanically interlocked linkage 16 of the present invention. As can be seen, the actuator arm 18 extends between the first vacuum bottle 34 and the second vacuum bottle 36. The actuator arm 18 is connected by bus 28 to the second electrical terminal 48.

The first vacuum bottle 34 is hermetically sealed in a vacuum condition. The first vacuum bottle 34 includes a first contactor 38 and a second contactor 40 within the interior of the vacuum bottle 34. The first contactor 38 is connected by bus 24 in electrically interconnection to the first electrical terminal 46. The second vacuum bottle 36 is also hermitically sealed in a vacuum condition. The second vacuum bottle 36 includes a first contactor 42 and a second contactor 44. The second contactor 44 is connected by bus 32 to the third electrical terminal 50.

With reference to FIG. 1, the first electrical terminal 46 can be connected to the substation bus 22. Similarly, the second electrical terminal 48 can be suitably connected to the collection/distribution feeder 26. Finally, the third electrical terminal 50 can be connected to the load bank impedance 30. The "impedance grounding switch 20" of FIG. 1 corresponds to the vacuum bottle 36 and the contactors 42 and 44 of FIG. 2. The "circuit breaker 14" of FIG. 1 corresponds to the first vacuum bottle 34 with contactors 38 and 40 therein.

In FIG. 2, it can be seen that the actuator arm 18 of the mechanically interlocked linkage 16 is in a first position. In this position, the contactors 38 and 40 are juxtaposed together so as to be in electrical connection. As such, power passing from electrical terminal 46 along bus 24 will be transmitted through the interior of the first vacuum bottle 34 through bus 28 to the electrical terminal 48 (or vice versa). The circuit between the electrical terminal 48 and the electrical terminal 50 through the second vacuum bottle 36 is open.

Figure 3:
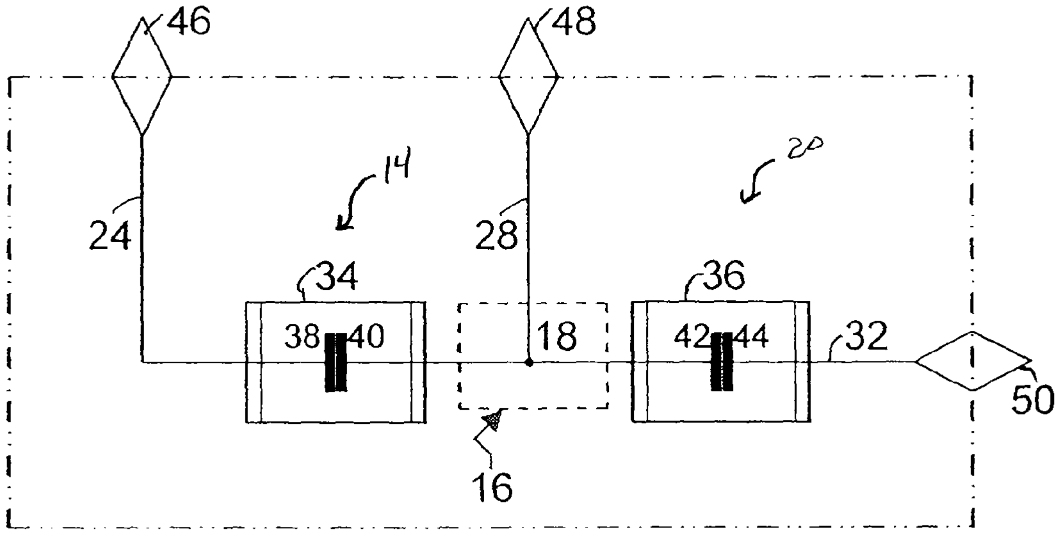
FIG. 3 is an illustration of the mechanical interlock of the present invention in combination with the first and second vacuum bottles and the actuator arm in the temporary position between the first and second stable positions.

In the event of the opening of the electrical system due to a desired operation or failure, the actuator arm 18 of the mechanically interlocked linkage 16 of the integral circuit breaker and impedance grounding switch 12 of the present invention is moved toward a second stable position. As such, it is in a temporary position between the first and second stable positions. In this temporary position, the grounding switch 20 closes and connects the load bank impedance 30 (associated with the third electrical terminal 50) to the collection/distribution feeder 26 (associated second electrical terminal 48), while the circuit breaker 14 is closed. As can be seen in FIG. 3, the contactors 38 and 40 are still juxtaposed together so as to be in electrical connection. The contactors 42 and 44 are also juxtaposed together so as to be in electrical connection.

Figure 4:
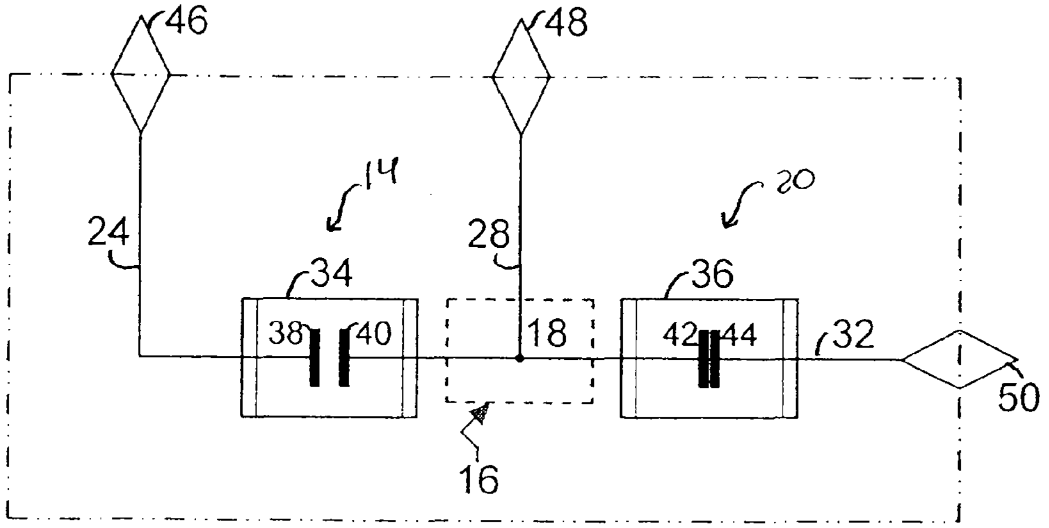
FIG. 4 is an illustration of the mechanical interlock of the present invention in combination with the first and second vacuum bottles showing, in particular, the actuator arm in the second stable position.

When the second stable position is reached, the circuit breaker 14 opens while the impedance grounding switch 20 remains closed. This connects the load bank impedance 30 to the collection/distribution feeder 26. As can be seen in FIG. 4, the contactors 38 and 40 are separated. The contactors 42 and 44 are juxtaposed together so as to be in electrical connection. As such, power passing from electrical terminal 48 along bus 28 will be transmitted through the interior of the second vacuum bottle 36 through the bus 32 to the electrical terminal 50 (associated with the load bank impedance 30).

Figure 5:
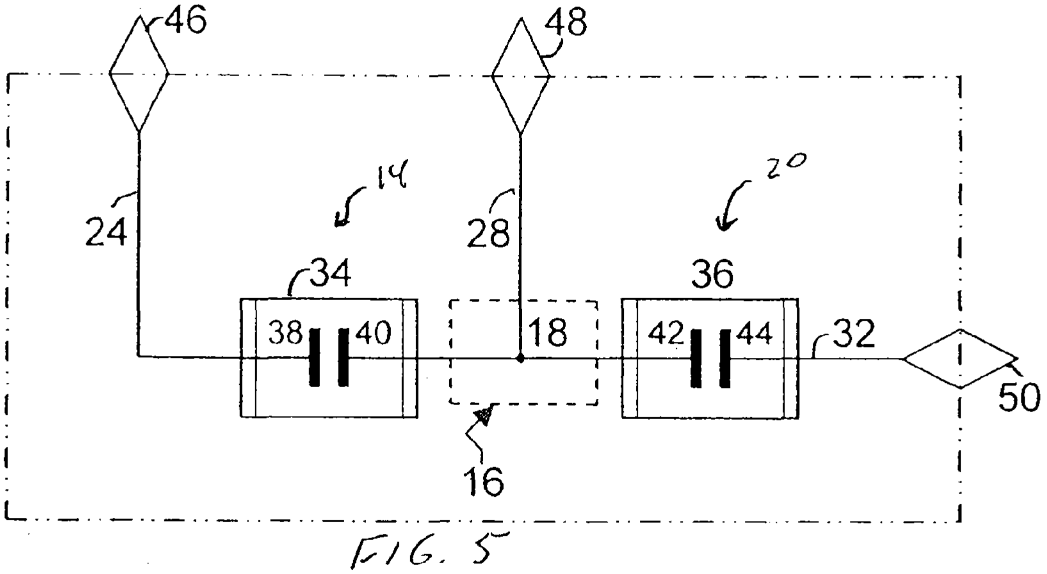
FIG. 5 is an illustration of the mechanical interlock of the present invention in combination with the first and second vacuum bottles and showing, in particular, the actuator arm in the temporary position between the second and first stable positions.

In the event of the closing of the electrical system, the actuator arm 18 of the mechanically interlocked linkage 16 of the integral circuit breaker and impedance grounding switch 12 of the present invention is moved toward the first stable position. In a temporary position between the second stable position and the first stable position, the impedance grounding switch 20 opens while the circuit breaker 14 is still opened. As such, can be seen in FIG. 5, the contactors 38 and 40 are separated and the contactors 42 and 44 are also separated. When the first stable position is reached, the circuit breaker 14 closes so as to connect the substation bus 22 to the collection/distribution feeder 26, while the impedance grounding switch 20 remains open.

The switching time between the first and second stable positions is minimized and occurs in a period of time less than one cycle.

A variety of techniques can be utilized for moving the actuator arm 28 between the first and second stable positions. For example, latches, springs, magnets, or other devices can be employed so as to instantaneously shift the actuator arm 18 between the first and second stable positions. Importantly, the alignment of the first vacuum bottle 34 with the second vacuum bottle 36 assures that this mechanical connection instantaneously serves to transfer switching motion. The present invention avoids the need for electrically-interlock switching devices. As such, the present invention improves switch reliability.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A circuit breaker and impedance grounding switch apparatus comprising:
- a first electrical terminal;
- a second electrical terminal;
- a third electrical terminal;
- a first vacuum bottle having a pair of contactors therein, one of said pair of contactors being electrically interconnected to said first electrical terminal;
- a second vacuum bottle having a pair of contactors therein, one of said pair of contactors of said second vacuum bottle being electrically interconnected to said third electrical terminal; and
- a mechanically interlocked linkage being electrically interconnected to said second electrical terminal, said mechanically interlocked linkage being movable between a first stable position and a second stable position, said first stable position electrically connecting to said first electrical terminal to said second electrical terminal, said second stable position electrically connecting said third electrical terminal to said second electrical terminal, said mechanically interlock linkage having a temporary position between said first and second stable positions electrically connecting simultaneous said first electrical terminal to said second electrical terminal and said third electrical terminal to said second electrical terminal.

2. The apparatus of claim 1, further comprising:
- an actuating means for moving said mechanically interlocked linkage between said first stable position and said second stable position.

3. The apparatus of claim 1, said first vacuum bottle being in longitudinal alignment with said second vacuum bottle, said mechanically interlocked linkage interposed between said first vacuum bottle and said second vacuum bottle.

4. The apparatus of claim 1, said mechanically interlock linkage comprising:
- an actuator arm being electrically connected to the other of said pair of contactors of said first vacuum bottle, said actuator arm being electrically connected to the other of said pair of contractors of said second vacuum bottle.

5. The apparatus of claim 1, said pair of contractors of said first vacuum bottle being electrically connected together when in said first stable position, said pair of contractors of said first vacuum bottle remaining electrically connected together in said temporary position between said first and second stable positions, said pair of contactors of said first vacuum bottle being electrically isolated from each other in said second stable position.

6. The apparatus of claim 5, said pair of contractors of said second vacuum bottle being electrically isolated from each other when in said first stable position, said pair of contactors of said second vacuum bottle being electrically connected together when in said temporary position between said first and second stable positions, said pair of contactors of said second vacuum bottle being electrically connected together in said second stable position.

7. A circuit breaker and impedance grounding switch apparatus comprising:
- a first vacuum bottle having a first contactor and a second contractor therein;
- a second vacuum bottle having a first contractor and a second contactor therein;
- an actuator arm connected at one end to said second contactor of said first vacuum bottle, said actuator arm connected at the other end to said first contactor of said second vacuum bottle; and
- a means for moving said actuator arm between said a first stable position in which said second contactor of said first vacuum bottle contacts said first contractor of said first vacuum bottle and a second stable position in which said first contactor of said second vacuum bottle contacts said second contractor of said second vacuum bottle, said means for moving said actuator bottle arm to a temporary position between said first and second positions in which said second contractor of said first vacuum bottle contacts said first contactor of said first vacuum bottle and in which said first contactor of said second vacuum bottle contacts said second contractor of said second vacuum bottle simultaneously.

8. The apparatus of claim 7, further comprising:
- a substation bus connected to said first contactor of said first vacuum bottle;
- a load bank impedance connected to said second contractor of that second vacuum bottle; and
- a collection/distribution feeder connected to said actuator arm.

9. The apparatus of claim 7, further comprising:
- a collection/distribution feeder connected by a bus to said actuator arm;
- a substation bus connected by a bus to said first contractor of said first vacuum bottle;
- a load bank impedance connected by a conductor or bus to said second contractor of said second vacuum bottle, said substation bus passing power to said collection/distribution feeder when said actuator arm is in said first staple position.

10. The apparatus of claim 9, said substation being a three phase system, said collection/distribution feeder being a three phase system, said load bank impedance being a three phase system, said actuator arm having a three phase system, said first vacuum bottle comprising three vacuum bottles, the first contactor in each of said three vacuum bottles being connected to a separate phase of said substation, said second vacuum bottle having three vacuum bottles, the second contractor in each of said three vacuum bottles of said second vacuum bottle being connected to a separate phase of said load bank impedance, said three phase system of said actuator arm being connected to a separate phase of said collection/distribution feeder.

11. The apparatus of claim 9, said first contactor of said first vacuum bottle being connected to a first electrical terminal, said actuator arm being electrically interconnected to a second electrical terminal, said second contactor of said second vacuum bottle being connected to a third electrical terminal, said first electrical terminal being connected to said substation bus, said second electrical terminal being connected to said collection/distribution feeder, said third electrical terminal being connected to said load bank impedance.

12. The apparatus of claim 11, further comprising:

an enclosure extending over and around said first and second vacuum bottles and said actuator arm, said first electrical terminal and said second electrical terminal and said third electrical terminal extending outwardly of said enclosure.

13. The apparatus of claim 9, said substation bus and said collection/distribution feeder and said load bank impedance having a voltage ranging from said 400 volts to 38 kilovolts.

14. A system for passing energy comprising:

a substation bus;

a collection/distribution feeder;

a load bank impedance;

a first bus connected to said substation bus;

a second bus connected to said collection/distribution feeder;

a third bus connected to said load bank impedance; and an integral circuit breaker and impedance grounding switch interconnected between a contactor of said first bus and a contactor of said second bus and a contactor of said third bus, said integral circuit breaker and impedance grounding switch having means for mechanically and selectively connecting the contactor of said first bus to the contactor of said second bus or for connecting the contactor of said third bus to the contactor of said second bus.

15. The system of claim 14, further comprising:

a first vacuum bottle having the contactor for said first bus and the contactor for said second bus therein;

a second vacuum bottle having the contactor for said second bus and the contactor for said third bus therein; and a mechanically interlocked linkage with an actuator arm extending between said first vacuum bottle and said second vacuum bottle, said actuator arm being electrically interconnected to said second bus.

16. The system of claim 14, said second bus being connected to said first bus.

17. The system of claim 14, said means for mechanically and selectively connecting occurring for a time period of less than one cycle.

* * * * *